United States Patent [19]

Gardner

[11] Patent Number: 5,064,317

[45] Date of Patent: Nov. 12, 1991

[54] MASS PRODUCED TOOLS

[76] Inventor: James J. Gardner, 700 E. Fifth Ave., Lancaster, Ohio 43130

[21] Appl. No.: 469,072

[22] Filed: Jan. 23, 1990

[51] Int. Cl.$^5$ ............................................. B23P 15/28
[52] U.S. Cl. ....................................................... 407/70
[58] Field of Search ............................. 407/70, 71, 67

[56] References Cited

U.S. PATENT DOCUMENTS

| 180,409 | 8/1876 | Alvord | 407/70 |
| 3,436,800 | 4/1969 | Cashman et al. | 407/70 |
| 3,466,721 | 9/1969 | Binns | 407/70 |
| 4,233,867 | 11/1980 | Zimmerman | 407/70 |

FOREIGN PATENT DOCUMENTS

| 0386916 | 6/1921 | Fed. Rep. of Germany | 407/70 |
| 0598713 | 3/1978 | U.S.S.R. | 407/70 |

Primary Examiner—D. S. Meislin
Assistant Examiner—Lawrence Cruz

[57] ABSTRACT

Mass produced tools particularly useful for forming parts on screw machines and turret lathes. A plurality of identical tool blanks are stacked one upon another in a holder and are located and clamped in positions corresponding to the distance generated by their height and front relief angle thus permitting surfaces of a form to be mass produced upon the blanks while keeping the blanks interchangeable. The blanks are individually finished with required angles, radii, and side relief. These mass produced tools increase the availability and decrease the cost of form tools produced one at a time by previous methods. In addition, since they are identical, these tools are quickly changed in service without resetting or regrinding thus reducing production machine down time.

7 Claims, 4 Drawing Sheets

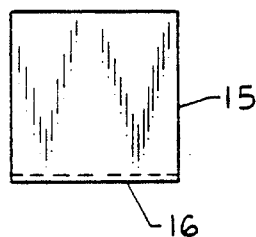
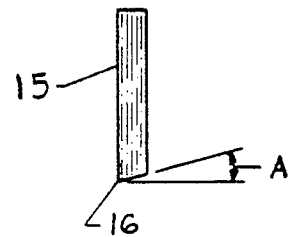
FIG. 4      FIG. 5
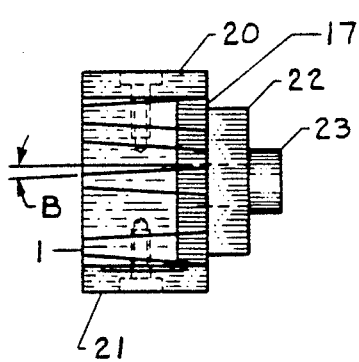
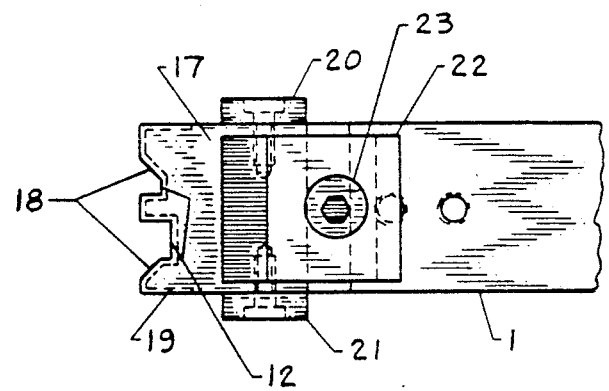
FIG. 7      FIG. 6
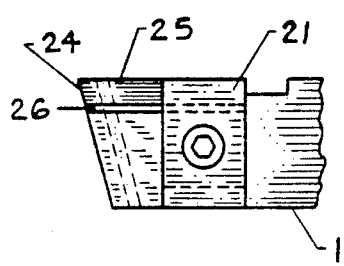
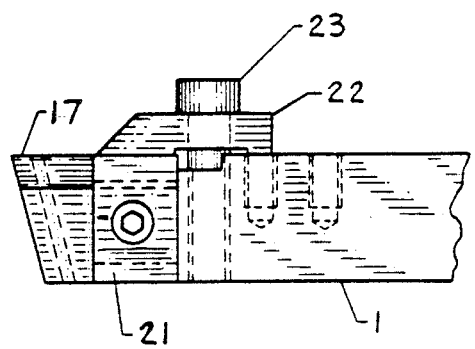
FIG. 9      FIG. 8

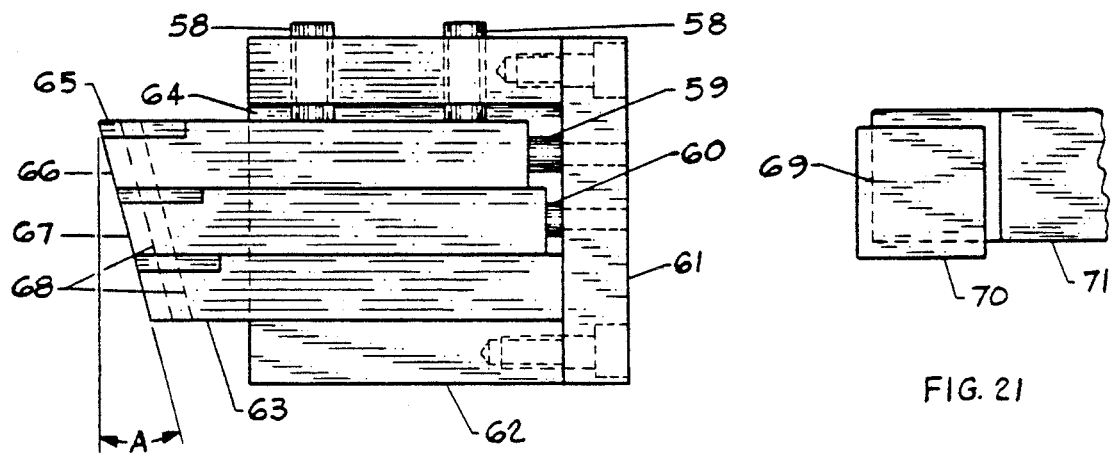
FIG. 16
FIG. 21
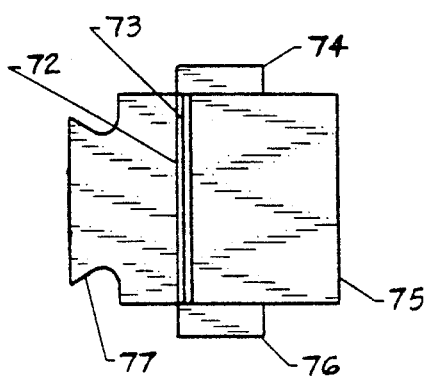
FIG. 18
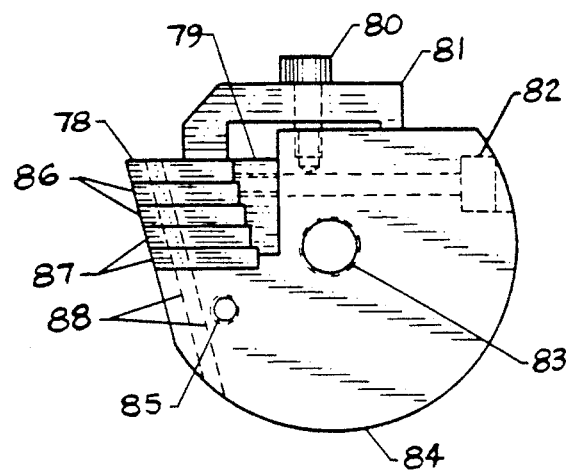
FIG. 17
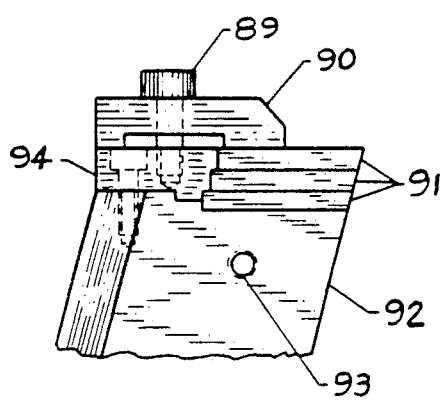
FIG. 19
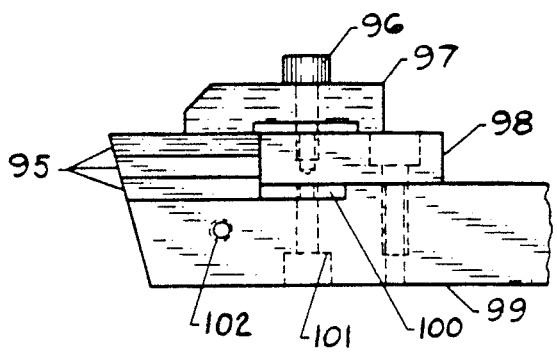
FIG. 20

MASS PRODUCED TOOLS

SUMMARY OF THE INVENTION

This invention relates to the mass production of tools used in manufacturing operations and is particularly useful for mass producing form cutting tools.

Form tools are used on automatic screw machines, computer numerical control turning equipment, and turret lathes to produce a stepped, angular, or irregular shape upon a workpiece. Forming is usually accomplished by feeding the tool into a rotating workpiece. The form tool is made so that the contour of the cutting edge produces the desired shape of the part.

Form tools are produced by grinding, electrical-discharge machining, or laser cutting a configuration onto cutting tool material such as high speed steel or carbide. In the past, form tools have been manufactured one at a time and are therefore less available and costly. In addition, form tool regrinding often interrupts production machining thus increasing machine down time.

It is, therefore, an object of the present invention to provide mass produced tools for manufacturing operations thus increasing availability and reducing cost.

It is also an object of the present invention to provide, through mass production, affordable form tools which are quickly changed in service without resetting or regrinding thus reducing production machine down time.

Briefly described, the foregoing and other objects are attained by stacking a plurality of tool blanks one upon another in holder and locating and clamping them in positions corresponding to the distance generated by their height and front relief angle thus permitting cutting edges of a form to be mass produced upon the blanks while keeping the blanks identical. The blanks are individually finished with required angles, radii, and side relief. Mass produced tools for turning, milling, broaching, and other manufacturing operations are similarly attained.

The foregoing summary sets forth a general view while other objects, features, and advantages will become apparent from the following description and drawings and by practice with the invention.

BRIEF DESCRIPTION OF THE DRAWINGS

FIG. 4 is a top view of an insert blank.

FIG. 5 is a side view of the blank shown in FIG. 4.

FIG. 6 is a top view of a form tool illustrating a finished insert ready to be put to use on a production machine.

FIG. 7 is an end view of the tool shown in FIG. 6.

FIG. 8 is a side view of the tool shown in FIG. 6.

FIG. 9 is a side view similar to FIG. 8 which illustrates a method of regrinding tools.

FIG. 16 is a side view of another aspect of the invention for mass producing tools.

FIG. 17 is a side view of mass produced tools in a circular holder.

FIG. 18 is a top view of mass produced tools in a dovetail holder. The top clamp is not shown.

FIG. 19 is a side view of mass produced tools in a dovetail holder.

FIG. 20 is a side view of another aspect of mass produced tools.

FIG. 21 is a top view of a further aspect of the invention for mass producing tools.

DETAILED DESCRIPTION OF PREFERRED EMBODIMENTS

Figure 1:
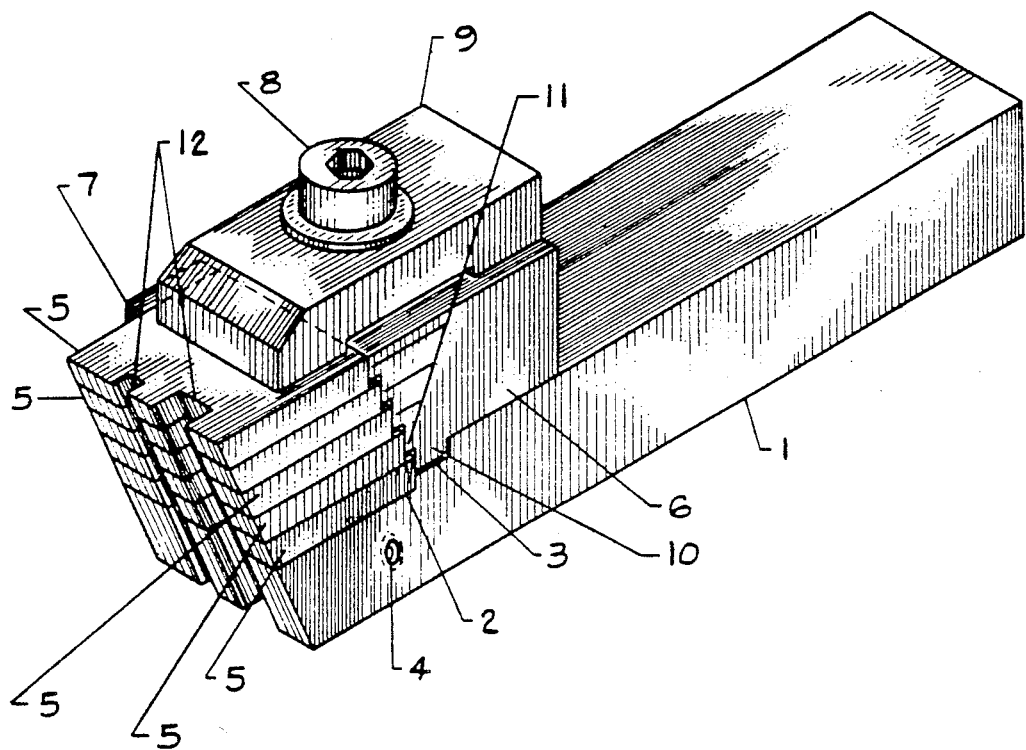
FIG. 1 is a pictorial view of a tool illustrating mass produced steps on a plurality of inserts.
Figure 3:
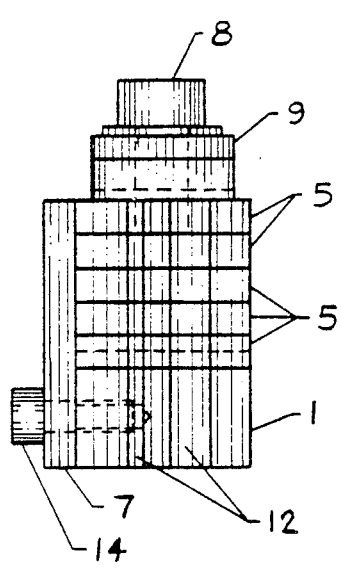
FIG. 3 is an end view of the tool shown in FIG. 1.
Figure 2:
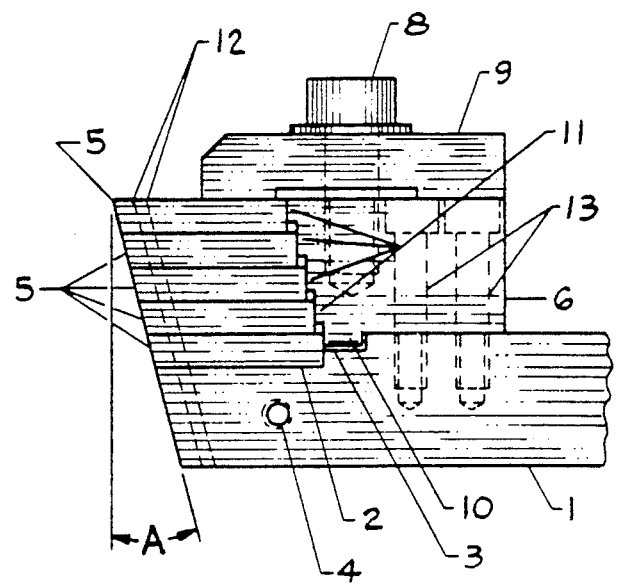
FIG. 2 is a side view of the tool shown in FIG. 1.

FIG. 1 of the drawings illustrates a tool assembly having mass produced steps 12 on a plurality of inserts 5 which are stacked upon the nose of a tool holder 1. FIG. 2 is a side view and FIG. 3 is an end view of the tool assembly of FIG. 1. In this case, the tool holder 1 is rectangular in cross section, however, it may be square, circular, dovetailed, or other configuration which is suitable for mounting and holding a tool for use. The tool holder 1 has an insert receiving pocket 2 at its forward end which provides flat surfaces for location and support against the bottom and rear of the lowest insert in the stack. The depth of pocket 2 is sized so that the cutting edges of the lowest insert (its upper plane) are coincident with the center of a workpiece. A removable side locator 7 provides positive transverse positioning of the inserts 5. The locator 7 is supported from the holder 1 by at least one suitable screw 14 shown in FIG. 3. The holder 1 is used for mass producing a plurality of inserts as shown in FIG. 1 and it is also utilized for holding a single insert for use as shown in FIG. 8. The threaded hole 4 of FIG. 1 provides anchorage for a screw used for the transverse clamp 21 of FIG. 8.

Front relief angle "A" of FIG. 2 developes the cutting edges of the inserts 5 and provides relief for the holder 1. The relief angle "A", which is vital for cutting operations, is produced for all insert cutting edges including steps 12 and is usually 10° when cutting with carbide. In order for finished inserts to be interchangeably used in holder 1 as shown in FIG. 8, it is necessary that they be the same length. If the finished inserts are not the same length, the tool must be reset or reground each time a worn insert is replaced. It is observed from FIG. 2 that if the inserts 5 are evenly aligned at their rear ends (similar to FIG. 14) the relief angle "A" generates different insert lengths. For example, the lowest insert in the stack would have the shortest length, the upper insert would have the longest length, and the inserts therebetween would vary in length according to their position in the stack. Therefore, in order to mass produce interchangeable cutting inserts, it is necessary to compensate for the distance generated by the height and front relief angle "A" of the inserts. This is accomplished by locator block 6 of FIGS. 1 and 2 which has individual locators 10 and 11 thereon for proper positioning of the inserts 5. The correct distance from the rear of one insert to the rear of an adjacent insert is calculated by solving a right triangle using angle "A" in conjunction with the height of the insert as the vertical leg of the triangle. Inserts 5 are the same height.

The holder 1 has a clearance slot 3 for locator 10. In order to load inserts in holder 1 for mass producing as shown in FIGS. 1 and 2, load the lowest insert first being careful it is against the locator 7 and the rear of pocket 2. Hold the insert firmly in place while moving locator block 6 in position until locator 10 contacts the rear of the insert. Next, secure locator block 6 to the holder 1 with screws 13. Next, stack the inserts one upon another and align them with locators 7 and 11 for correct positioning for mass producing. Finally, the inserts are secured in place with clamp 9 and screw 8. It should be emphasized that the spacing provided by locators 10 and 11 must correspond with the distance generated by angle "A" and the height of the inserts in order to provide suitable interchangeability of inserts. Cutting edges may be produced on several sides of the blanks.

FIG. 4 illustrates a top view and FIG. 5 a side view of a tool blank 15 which has a cutting edge 16 generated by a front relief angle "A". A plurality of blanks 15 are stacked upon the nose of tool holder 1 and are located and clamped as shown in FIG. 1 for the mass production of interchangeable inserts having steps similar to 12. Tool blanks 15 may be supplied without angle "A" of FIG. 5 and without cutting edge 16 as these may be ground upon the blanks at assembly into FIG. 1. Tool blanks 15 become semifinished inserts 5 of FIG. 1 when steps 12 are mass produced thereon. Blanks 15 are normally identical. If necessary, the front edges of blanks 15 are ground even at assembly in FIG. 1.

FIG. 6 illustrates a top view, FIG. 7 an end view, and FIG. 8 a side view of tool holder 1 equipped with a single finished insert 17 which is located, clamped, and ready for use in manufacturing operations. Semifinished inserts 5 of FIG. 1 become finished inserts 17 of FIG. 6 when they are individually mounted in tool holder 1 and finished with required angles 18 and side relief 19 which is typically shown as angle "B" of FIG. 7. In order to mount an insert 5 for finishing, locator 7 of FIG. 3 is removed from tool holder 1 and replaced with short locator 20 of FIGS. 6 and 7. In addition, locator block 6 along with clamp 9 and screw 8 of FIG. 1 are removed from holder 1. The semi-finished insert 5 is placed in pocket 2 of holder 1, located against locator 20, secured with clamp 21, and downwardly secured with clamp 22 and screw 23 of FIG. 6. Since they are identical, the semi-finished inserts 5 may be finished in mass production fashion by producing a feature such as an angle or radius on a plurality of inserts successively. For example, when an angle such as 18 of FIG. 6 is set up to be produced, it is advantageous to produce the angle upon all the inserts before making another set up thus reducing set up time. Alternately, since it cost very little extra to produce a plurality of semi-finished inserts 5 of FIG. 1, it may be desirable to finish one or two inserts and save the rest for finishing when needed at a later date. Therefore, semi-finished inserts which are quickly and economically finished may be kept on hand. In review, blanks 15 of FIG. 4 become semifinished inserts 5 of FIG. 1, which become finished inserts 17 of FIG. 6; and tool holder 1 is used for both mass producing and using tools.

FIG. 9 is a side view similar to FIG. 8 and illustrates regrinding tools in mass production fashion. Worn inserts are renewed by grinding the cutting plane 25 of FIG. 9. Plane 25 is normally reground 0.003 to 0.005 inch for carbide and up to 0.03 inch for high speed steel cutters. It is vital that the cutting plane 25 of reground insert 24 be restored to the center of the workpiece. This is accomplished by a shim 26. In order to regrind a plurality of inserts and retain the proper cutting plane center, shim 26 is placed upon holder 1 as shown in FIG. 9 and a worn insert is positioned on the shim and secured with clamp 21. Cutting plane 25 is ground an amount which places the reground insert 24 on center. All worn inserts are similarly reground one after another in holder 1 with the appropriate shim 26. The shim 26 remains with holder 1 during use and all reground inserts are interchanged thereupon. Shim 26 and the cutting insert are downwardly secured in use with clamp 22 and screw 23 of FIGS. 6, 7, and 8. It should be noted that tool holder 1 is utilized for mass producing tools as shown in FIG. 1, using tools as shown in FIG. 8, and regrinding tools as in FIG. 9.

Figures 10, 11:
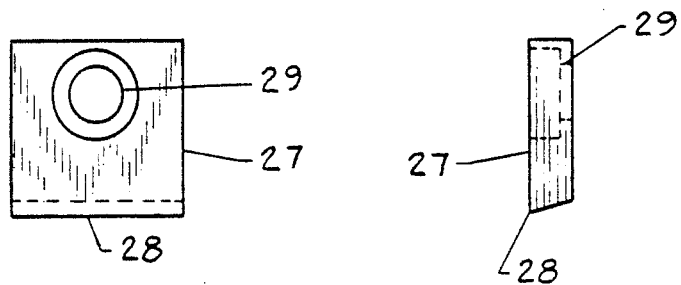
FIG. 10 is a top view of a modified insert blank.
FIG. 11 is a side view of the insert shown in FIG. 10.

FIG. 10 is a top view and FIG. 11 a side view of another tool blank 27 having a cutting edge 28 and a counterbored hole 29. Tool blank 27 is similar to blank 15 of FIG. 4 except for hole 29. Blank 27 is used for all the functions described for blank 15 including mass production in FIG. 1, finishing in FIG. 6, and regrinding in FIG. 9. When a single insert made from blank 27 is used in FIGS. 6, 7, and 8, the insert is downwardly clamped with a screw which passes through counterbored hole 29 and anchors in a threaded hole in holder 1. This eliminates clamp 22 and screw 23 of FIG. 8. Mass producing blanks 27 as in FIG. 1 utilizes downward clamp 9 and screw 8.

Figures 12, 13:
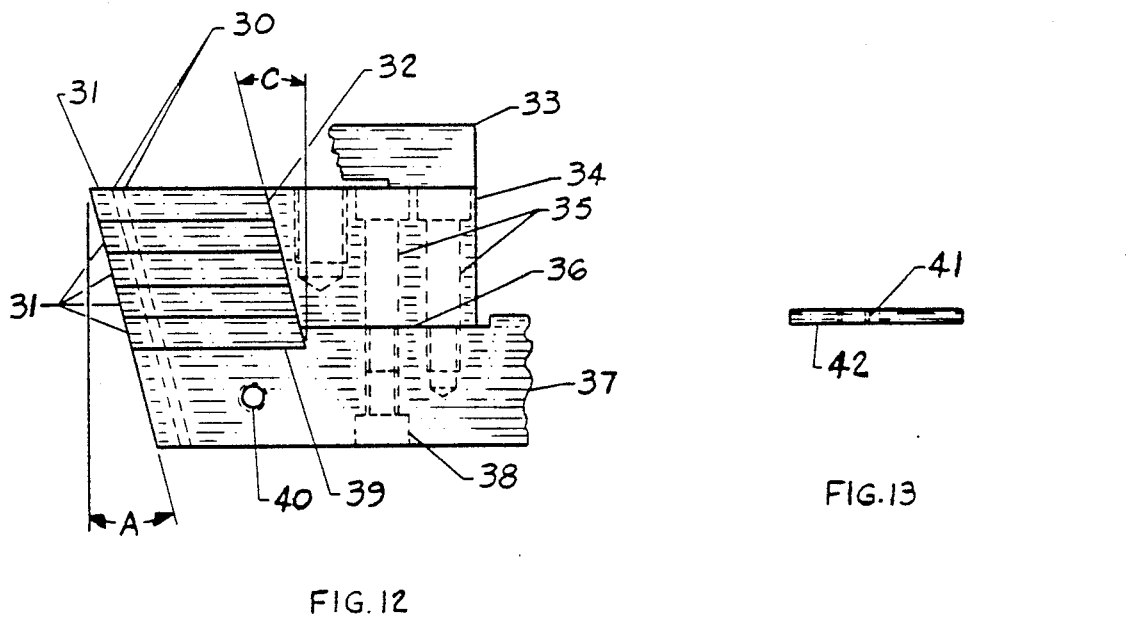
FIG. 12 is a side view of an alternate tool assembly for mass producing.
FIG. 13 is a side view of a cover plate used in the tool of FIG. 12.

FIG. 12 is a side view illustrating an alternate form of the invention for mass producing tools. In this case, mass produced steps 30 are made on a plurality of inserts 31 which are stacked upon the nose of a tool holder 37. This arrangement is similar to FIG. 1 except for angular surface 32 and cutout 36. The locator block 34 has angular surface 32 which provides the correct positioning for mass producing inserts 31. The rear of inserts 31 are made at angle "C" which matches surface 32. In order for inserts 31 to be interchangeable, front relief angle "A" and angle "C" are the same. Tool holder 37 is equipped with insert receiving pocket 39 which has an angular rear end as shown to match the rear of inserts 31. In order to load blanks for mass producing, load the lowest blank first being careful it is against a transverse locator (not shown) and the rear of pocket 39. Hold the blank firmly in place while moving locator block 34 in position until it contacts the rear of the blank. Next, secure locator block 34 to the holder 37 with screws 35. Next, stack the blanks one upon another and align them with a transverse locator (not shown) and block 34. Finally, the blanks are secured in place with clamp 33. The threaded hole 40 is for a screw for a transverse clamp similar to FIG. 1. The cutout 36 provides a flat surface for block 34. When tool holder 37 is utilized for finishing and using tools as in FIGS. 6 and 8, block 34 and clamp 33 are removed and cutout 36 is covered for protection with cover 42 of FIG. 13. Cover 42 is held in place with screw 38 of FIG. 12 and threaded hole 41 of FIG. 13.

Figures 14, 15:
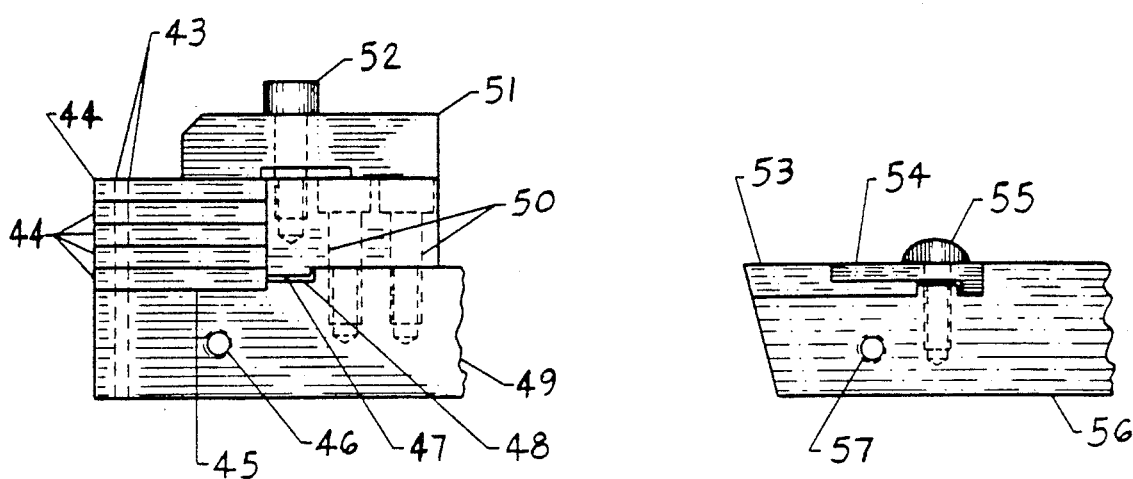
FIG. 14 is a side view of another alternate tool assembly for mass producing.
FIG. 15 is a side view of a modified tool assembly.

FIG. 14 is a side view showing mass produced inserts 44 without front relief angle "A" of FIG. 2. In this case, steps 43 refer to a configuration including angles and radii. After mass producing as shown in FIG. 14, the inserts 44 are individually provided with front and side relief. Tool holder 49 is equipped with pocket 45 and threaded hole 46 for transverse clamping. Clearance slot 48 is for locator 47. The locator block is secured with screws 50. Clamp 51 and screw 52 secure the inserts when mass producing.

FIG. 15 is a side view of a modified insert 53, clamp 54, and holder 56. In this case, insert 53 is cut out at its rear portion to receive heel clamp 54. This modification is used to advantage when it is desirable for chips to flow smoothly across the cutting plane of insert 53. Clamp 54 does not interrupt chip flow. The heel clamp is secured with screw 55. Threaded hole 57 is for transverse clamping.

FIG. 16 is a side view of yet another form of the invention. In this case, the blanks 63, 66, and 67 are tipped with tool material 65 such as carbide. The blanks may also be made of solid high speed steel or carbide. Holder 62 is a block having a receiving slot 64 therein for the tool blanks. The slot 64 developes a lower ledge for supporting the blanks and an upper ledge for supporting clamp screws 58. Locator block 61 has individual locator buttons 59 and 60 which correctly position the blanks for mass producing the steps 68. As in FIG. 1, the locators must compensate for the front relief angle "A" and the height of the blanks in order for the tools to be interchangeable. After mass producing steps 68, the blanks are individually finished in holder 62. In this case, a shim or longer clamp screws are used to support the lowest blank in the stack while it is finished. The blanks 63, 66, and 67 may be different heights. This is made up for by locators 59 and 60. The correct spacing of the blanks is found by solving a triangle using angle "A" and the height of each blank, similar to FIG. 1.

When it is desirable to mass produce a compound angle upon a plurality of interchangeable tools, it is necessary to compensate for the angle and the height of the blanks in two directions as shown in the top view of FIG. 21. In this case, 71 is a tool holder with all locators and clamps omitted for clarity. Lower blank 69 is square and rests upon the nose of holder 71. Upper blank 70 is offset from blank 69 by locators (not shown) in two directions. Thus a compound angle with cutting relief similar to angle "A" of FIG. 2 is mass produced upon a plurality of blanks without destroying interchangeability.

FIG. 17 is a side view of a form of the invention wherein the tool holder 84 is circular. Holder 84 is mounted for use on a machine by threaded hole 83. In this case, lower blanks 87, middle blanks 86, and upper blank 78 are different widths required for different width cutting tools which have similar step configurations thereon. The blanks are positioned against locator 79 which is secured to the holder with screw 82. The blanks are positioned transversely as required similar to FIG. 1 and are clamped utilizing threaded hole 85. Clamp 81 and screw 80 supply downward pressure. Steps 88 are mass produced upon the blanks as previously described. Tool holder 84 is used similar to tool holder 1 of FIGS. 1, 6, 8, and 9 to mass produce, finish, regrind, and use tools for manufacturing.

FIG. 18 is a top view for mass producing tools utilizing a dovetail tool holder 77 with top clamps and locators omitted for clarity. The blanks to be mass produced are 72, 73, and 75. The blanks are positioned against 74 and secured with clamp 76. The dovetail tool holder 77 is used similar to holder 1 of FIGS. 1, 6, 8, and 9 to mass produce, finish, regrind, and use tools for manufacturing operations.

FIG. 19 is a side view for mass producing tools utilizing a vertical tool holder 92 which could be dovetailed similar to FIG. 18 or keyed to fit a machine tool post. The blanks 91 are positioned against locator 94 and downwardly secured with clamp 90 and screw 89. Threaded hole 93 is for transverse clamping of blanks 91. Tool holder 92 is used similar to holder 1 of FIGS. 1, 6, 8, and 9 to mass produce, finish, regrind, and use tools for manufacturing operation.

FIG. 20 is a side view of another aspect of the invention. Blanks 95 are located at their rear end by block 98 and spacer 100 which are secured to holder 99. In this case, the front relief angle generates different blank lengths which are compensated for in use by utilizing different length or adjustable spacers 100. After the blanks 95 are mass produced similar to those of FIG. 1, the correct positioning of the inserts in holder 99 is provided by spacer 100 which varies in length or slides in a slot. Spacer 100 is secured by screw 101. Downward pressure for securing blanks 95 during mass production is provided by clamp 97 and screw 96. Threaded hole 102 is for transverse clamping. Holder 99 is used for mass producing, finishing, regrinding, and for manufacturing operations similar to FIG. 1.

Holder 1 of FIG. 1 is also used to mass produce blanks similar to 15 of FIG. 4. In this case, a plurality of blanks similar to 15, but without angle "A" of FIG. 5, are stacked, located, and clamped upon the nose of holder 1 using a locator similar to 6 of FIG. 1. Angle "A" of FIG. 5 is mass produced on at least one side of the blanks. Indexable inserts are mass produced by grinding more than one side of a blank. These plain inserts (without steps 12 of FIG. 1) are used for milling turning, broaching, forming, and other manufacturing operations. These inserts are interchangeable.

The present inventive concept is particularly useful for mass producing tools or parts which have many notches or teeth such as saw blades. In this case, holder 1 and locator block 6 or FIG. 1 are wide enough to support the length of a saw blade. A plurality of saw teeth are mass produced according to the invention.

Holder 1 of FIG. 1 is oriented at any angle for mass producing tools or two or more positions are utilized. For example, if holder 1 of FIG. 1 is positioned 90° from its present orientation, inserts 5 would be side by side rather than stacked one upon another. It is possible, for a complex job, that two or more orientations are required for mass producing tools according to the present invention. In this case, side relief angles are mass produced on tools.

Various modifications and changes may be made in the present invention, within the scope of the appended claims, without departing from the spirit of the invention. For example, a variety of clamping, locating, and holding means are useful to mass produce tools. Those modifications mentioned above are but a few which may be resorted to in constructing mass produced tools of the present invention.

I claim:

1. A tool assembly for producing a plurality of interchangeable cutters and for use in a machine tool, which comprises:
    a tool holder having a tool support surface adapted to receive a plurality of expendable inserts which are situated to engage a rotating member and a mounting portion for mounting said tool holder in a machine tool;
    wherein each of said inserts has a rotating member engaging end and a locating portion;
    lateral alignment means for providing lateral positioning of each of said inserts adjacent said tool support surface;

locating means for locating a plurality of inserts on said tool holder;

said locating means having a plurality of locator surfaces each adapted to engage one of said locating portions on each of said inserts; so that the rotating member engaging end of each of said inserts is in flush alignment with each of the other rotating member engaging ends of said inserts forming a common relief angle wherein each of said locator surfaces is positioned in an incrementally stepped relation to the preceding locator surface and clamping means for clamping said inserts in said assembly;

and clamping means for clamping said inserts in said tool assembly.

2. The tool assembly of claim 1, which further comprises second clamping means for clamping an insert against said lateral alignment means.

3. The tool assembly of claim 1, wherein said rotating member engaging end of each said insert includes a relieved face which defines a cutting edge; and wherein each of said inserts is the same size.

4. The tool assembly of claim 1, wherein said plurality of inserts are stacked one on another such that the locating portions on adjacent stacked inserts engage adjacent locator surfaces of said locating means.

5. The tool assembly of claim 1, wherein said tool holder has a front surface which intersects said tool support surface at one end thereof.

6. The tool assembly of claim 1, wherein said tool holder has a relieved surface adjacent said positioning means to enable said locating means to engage the locating portion of an insert which abuts said positioning means.

7. The tool assembly of claim 1, wherein said locating means engages the locating portion of an insert which abuts said positioning means; and affixing means for removably affixing said locating means to said tool holder.

* * * * *